US009703489B2

(12) United States Patent
Yokota et al.

(10) Patent No.: US 9,703,489 B2
(45) Date of Patent: Jul. 11, 2017

(54) INFORMATION PROCESSING SYSTEM, INFORMATION PROCESSING DEVICE, INFORMATION PROCESSING METHOD, AND NON-TRANSITORY COMPUTER-READABLE STORAGE MEDIUM STORING INFORMATION PROCESSING PROGRAM FOR PERFORMING INFORMATION PROCESSING USING NON-CONTACT COMMUNICATION WITH A DATA STORAGE MEDIUM (71) Applicant: NINTENDO CO., LTD., Kyoto (JP)

(72) Inventors: Genki Yokota, Kyoto (JP); Kouhei Maeda, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 62 days.

(21) Appl. No.: 14/934,436

(22) Filed: Nov. 6, 2015

(65) Prior Publication Data
US 2016/0334994 A1 Nov. 17, 2016

(30) Foreign Application Priority Data

May 11, 2015 (JP) ................................. 2015-096505

(51) Int. Cl.
*A63F 9/24* (2006.01)
*G06F 3/06* (2006.01)
(Continued)

(52) U.S. Cl.
CPC .......... *G06F 3/0605* (2013.01); *A63F 13/235* (2014.09); *A63F 13/323* (2014.09);
(Continued)

(58) Field of Classification Search
CPC ...... A63F 13/235; A63F 13/323; A63F 13/70; A63F 13/95; A63F 13/98; A63F 13/40;
(Continued)

(56) References Cited

U.S. PATENT DOCUMENTS 9,582,147 B2 * 2/2017 Matsumura ............. A63F 13/10
2014/0256430 A1 * 9/2014 Matsumura ............. A63F 13/10
463/31

(Continued)

FOREIGN PATENT DOCUMENTS

JP 2014-171678 9/2014

*Primary Examiner* — Hong Kim
(74) *Attorney, Agent, or Firm* — Nixon & Vanderhye PC (57) ABSTRACT Provided is an information processing system to improve enjoyment in information processing using data obtained in non-contact communication. The information processing system includes a dedicated figure, a non-contact communication unit, a processing unit, and a first storage unit. The dedicated figure is configured to store data and has a non-contact communication function. The non-contact communication unit is configured to read data from the dedicated figure by using the non-contact communication function of the dedicated figure. The processing unit performs figure data processing based on the data read by the non-contact communication unit. The first storage unit stores the number of times of execution of the figure data processing. Processing details of the figure data processing performed by the processing unit depend on the number of times of execution stored in the first storage unit.

8 Claims, 6 Drawing Sheets (51) Int. Cl.
    *H04B 5/00*     (2006.01)
    *A63F 13/323*     (2014.01)
    *A63F 13/95*     (2014.01)
    *G06F 3/0482*     (2013.01)
    *G06F 13/38*     (2006.01)
    *A63F 13/40*     (2014.01)
    *A63F 13/69*     (2014.01)
    *A63F 13/235*     (2014.01)

(52) U.S. Cl.
    CPC .............. *A63F 13/40* (2014.09); *A63F 13/69* (2014.09); *A63F 13/95* (2014.09); *G06F 3/0482* (2013.01); *G06F 3/067* (2013.01); *G06F 3/0634* (2013.01); *G06F 3/0653* (2013.01); *G06F 13/385* (2013.01); *H04B 5/0031* (2013.01)

(58) Field of Classification Search
    CPC ...... A63F 13/69; G06F 3/0605; G06F 3/0482; G06F 13/385; G06F 3/0634; G06F 3/0653; G06F 3/067; H04B 5/0031
    USPC ........................ 463/43, 31; 711/154; 715/810
    See application file for complete search history.

(56) References Cited

U.S. PATENT DOCUMENTS

| | | | |
|---|---|---|---|
| 2016/0171255 A1* | 6/2016 | Horita | G06F 3/0619 340/10.51 |
| 2016/0346697 A1* | 12/2016 | Tanabe | A63F 13/70 |
| 2016/0358239 A1* | 12/2016 | Inagaki | G06Q 30/0619 |
| 2016/0364178 A1* | 12/2016 | Izuno | G06F 3/0659 |

\* cited by examiner

INFORMATION PROCESSING SYSTEM, INFORMATION PROCESSING DEVICE, INFORMATION PROCESSING METHOD, AND NON-TRANSITORY COMPUTER-READABLE STORAGE MEDIUM STORING INFORMATION PROCESSING PROGRAM FOR PERFORMING INFORMATION PROCESSING USING NON-CONTACT COMMUNICATION WITH A DATA STORAGE MEDIUM

CROSS REFERENCE TO RELATED APPLICATION

This application claims the benefit of Japanese Priority Patent Application No. 2015-096505 filed on May 11, 2015, the entire contents of which are incorporated herein by reference.

FIELD

The technology herein relates to an information processing system, an information processing device, an information processing method, and a non-transitory computer-readable storage medium that stores an information processing program, for performing information processing using non-contact communication with a data storage medium.

BACKGROUND AND SUMMARY

There has been known a game device that communicates with an integrated circuit tag (IC tag) embedded in a dedicated figure using a non-contact communication technique such as near field communication (NFC). The IC tag stores character data corresponding to a design of the dedicated figure. The game device reads the IC tag embedded in the dedicated figure using non-contact communication. This makes it possible to use, within a game, the character data corresponding to the design of the dedicated figure.

The technology is intended to improve enjoyment in information processing that uses the data obtained in non-contact communication.

The information processing system according to an example embodiment includes: a data storage medium being configured to store data and having a non-contact communication function, and at least one processor, the at least one processor being configured to read the data from the data storage medium by using the non-contact communication function of the data storage medium, the at least one processor being further configured to perform first information processing based on the data that have been read, the at least one processor being further configured to store the number of times of execution of reading of the data or the number of times of execution of the first information processing, wherein processing details of the first information processing depend on the stored number of times of execution. With this configuration, the processing details of the first information processing based on the data read by the non-contact communication is determined depending on the number of times of execution of reading of the data or the number of times of execution of the first information processing. Accordingly, enjoyment of the first information processing based on the data read by the non-contact communication can be improved.

In the above-described information processing system, the at least one processor is further configured to be capable of prohibiting consecutive execution of the first information processing. This configuration can avoid consecutive execution of the first information processing and achieve a good balance between the first information processing and other information processing.

In the above-described information processing system, the at least one processor is further configured to be capable of executing subsequent first information processing in a case where a first predetermined condition (for example, execution of a battle processing) is satisfied after execution of the first information processing. With this configuration, satisfaction of the first predetermined condition after execution of the first information processing enables execution of the subsequent first information processing. This makes it possible to avoid consecutive execution of the first information processing and, at the same time, to promote to satisfy the first predetermined condition.

In the above-described information processing system, the at least one processor is further configured to be capable of executing the second information processing (for example, enabling a figure-corresponding character) based on the data, when the stored number of times of execution is the predetermined number of times, and a second predetermined condition (for example, winning a battle with the figure-corresponding character) is satisfied in the first information processing. With this configuration, when the number of times of execution of the first information processing reaches a predetermined number of times, a predetermined condition is imposed. Then, if this condition is satisfied, the second information processing is executed. Accordingly, this makes it possible to improve enjoyment of the first information processing based on the data read by the non-contact communication.

In the above-described information processing system, the data storage medium may be provided in a character representation body (for example, a dedicated figure), the data may be data that correspond to the character represented by the character representation body (for example, identification data for identifying the character type), and the first information processing may be information processing (for example, a conversation and a battle between the figure-corresponding character and an own character) using the data. With this configuration, the character represented by the character representation body matches the character used in the first information processing. This makes it possible to obtain a sense that the character represented by the character representation body has been captured from the character representation body into the first information processing performed by a processing unit. This configuration thus can improve enjoyment of the first information processing.

An information processing device according to an aspect includes at least one processor, the at least one processor being configured to read data from a data storage medium by using a non-contact communication function of the data storage medium being configured to store data and having the non-contact communication function, the at least one processor being further configured to perform first information processing based on the data that have been read, the at least one processor being further configured to store the number of times of execution of data reading or the number of times of execution of the first information processing, wherein processing details of the first information processing depend on the stored number of times of execution. Also with this configuration, the processing details of the first information processing based on the data read by the non-contact communication is determined depending on the number of times of execution of reading of the data or the number of times of execution of the first information processing. Accordingly, enjoyment of the first information processing based on the data read by the non-contact communication can be improved.

An information processing method according to an aspect is a method for reading data from a data storage medium by using a non-contact communication function of the data storage medium being configured to store data and having the non-contact communication function, performing first information processing based on the data, and storing the number of times of execution of reading of the data or the number of times of execution of the first information processing, wherein processing details of the first information processing depend on the stored number of times of execution. Also with this configuration, the processing details of the first information processing based on the data read by the non-contact communication is determined depending on the number of times of execution of reading of the data or the number of times of execution of the first information processing. Accordingly, enjoyment of the first information processing based on the data read by the non-contact communication can be improved.

A non-transitory computer-readable storage medium according to an aspect stores an information processing program. This information processing program causes the computer to read data from a data storage medium by using a non-contact communication function of the data storage medium being configured to store data and having the non-contact communication function, perform first information processing based on the data that have been read, store the number of times of execution of reading of the data or the number of times of execution of the first information processing, wherein processing detail of the first information processing depend on the stored number of times of execution. Also with this configuration, the processing details of the first information processing based on the data read by the non-contact communication is determined depending on the number of times of execution of reading of the data or the number of times of execution of the first information processing. Accordingly, enjoyment of the first information processing based on the data read by the non-contact communication can be improved.

DETAILED DESCRIPTION OF NON-LIMITING EXAMPLE EMBODIMENTS

Hereinafter, embodiments will be described with reference to the drawings. The embodiments described below are example embodiments for implementation of the technology. The technology, therefore, is not limited to a specific configuration described below. In implementation of the technology, a specific configuration may be adopted appropriately according to the embodiment.

Figure 1:
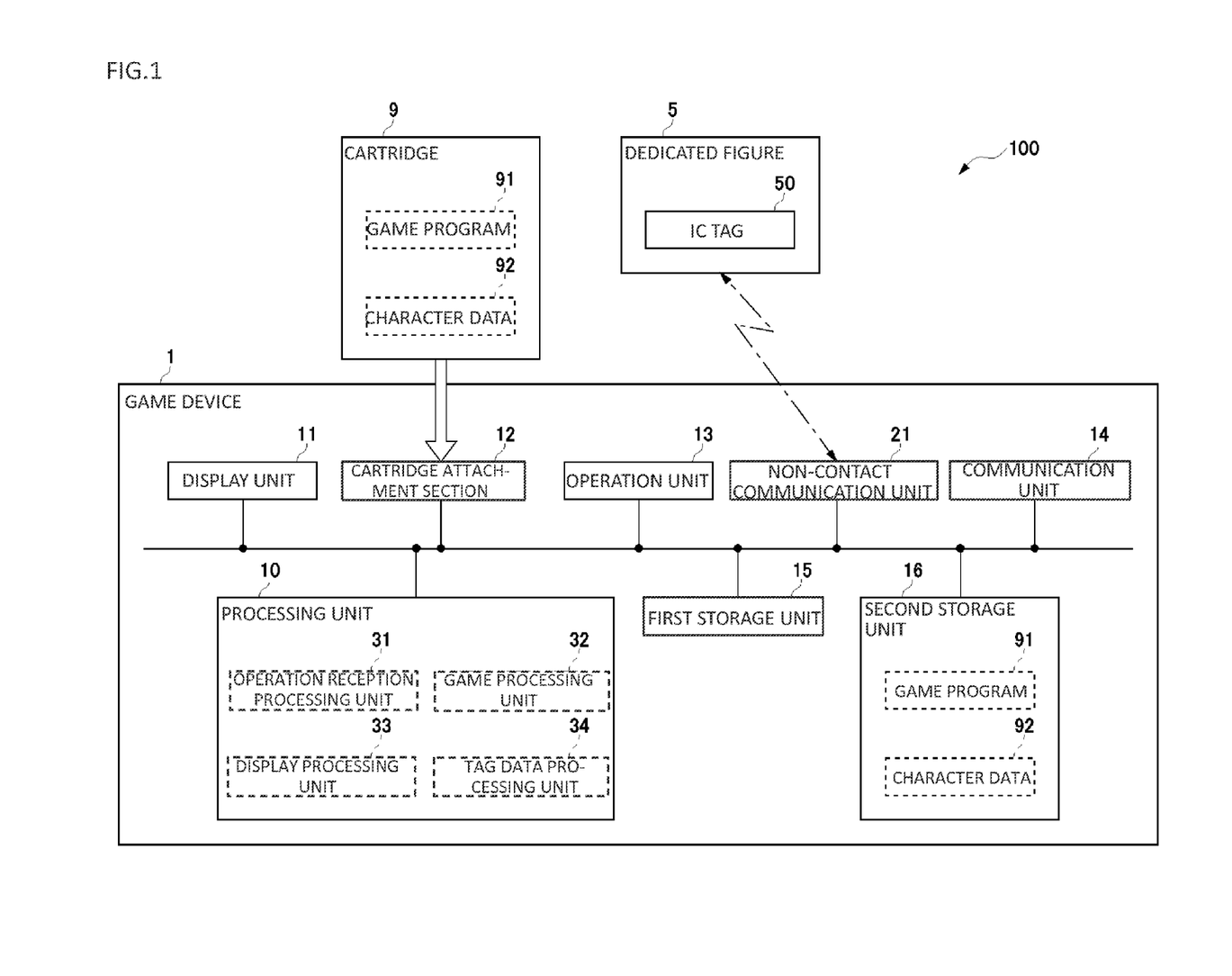
FIG. 1 shows an example non-limiting block diagram of the information processing system configuration.

FIG. 1 is a block diagram showing a configuration of an information processing system according to an embodiment. An information processing system 100 includes an information processing device 1, a character representation body 5 including a data storage medium, and a game storage medium 9. In the present embodiment, an example will be described in which the information processing system 100 is a game system, the information processing device 1 is a game device, the character representation body 5 is a dedicated figure, data storage medium of the character representation body 5 is an IC tag, and a game storage medium 9 is a cartridge. In other words, a game system 100 includes a game device 1, a dedicated FIG. 5 that includes an IC tag 50, and a cartridge 9.

Figure 2:
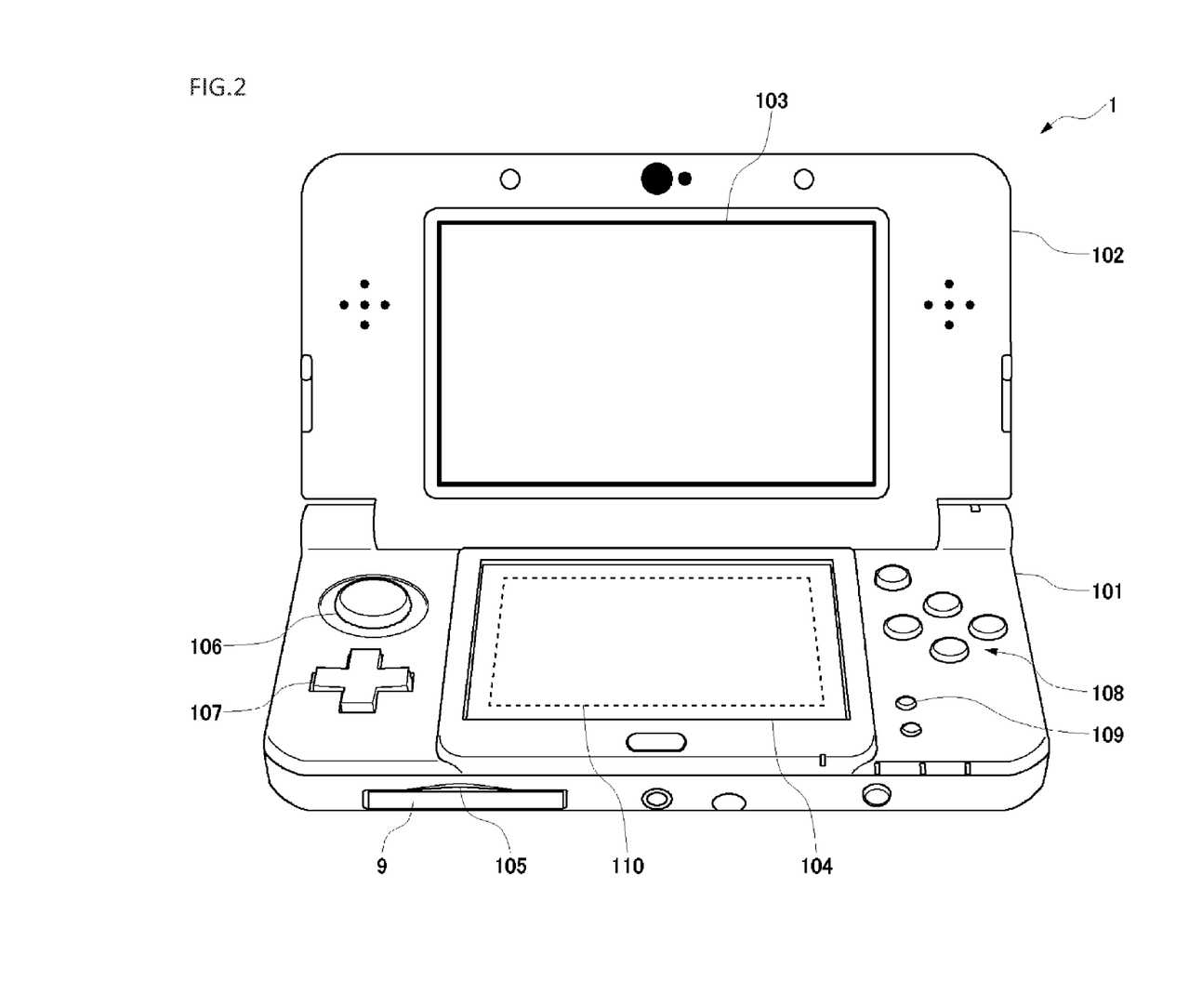
FIG. 2 shows an example non-limiting external perspective view of a game device.

FIG. 2 is an external perspective view of the game device 1. The game device 1 is a portable game device that can be easily carried by a user. The game device 1 has a shape foldable at a hinge connecting a main unit 101 and a display unit 102. Hereinafter, each configuration of the game device 1 shown in FIG. 2 will be described focusing on a configuration related to the configuration shown in FIG. 1.

The display unit 102 includes an upper screen 103 serving as a display unit 11. The main unit 101 has a lower screen 104 also serving as the display unit 11. The main unit 101 includes a slot 105 serving as a cartridge attachment section 12, a slide pad 106 serving as an operation unit 13, a cross button 107, four A/B/X/Y single buttons 108, and a start button 109. Inside the lower screen 104, a non-contact communication unit 21 is provided. The upper screen 103 and the lower screen 104 are configured with liquid crystal display (LCD) panel, a plasma display panel (PDP), or the like. The lower screen 104 is a touch panel and serves as the operation unit 13 as well as serves as the display unit 11.

FIG. 2 also shows the cartridge 9 loaded in the slot 105. In the cartridge 9, a game program 91 and character data 92 are recorded. The cartridge 9 may be writable. In this case, saved data of the game can be recorded in the cartridge 9. The game storage medium 9 is not limited to a cartridge. It may be provided in a form of a card, a cassette, or a disk.

Referring back to FIG. 1, the game device 1 incorporates a processing unit 10, a communication unit 14, a first storage unit 15, a second storage unit 16, the non-contact communication unit 21, or the like. The processing unit 10 is configured with a processing unit such as a central processing unit (CPU) or a micro processing unit (MPU). The processing unit 10 reads a game program 91 stored in the second storage unit 16 or reads the game program 91 recorded on the cartridge 9 attached to the cartridge attachment section 12, out to the first storage unit 15 and then executes the program. With this configuration, the processing unit 10 performs various kinds of information processing related to the game. The processing unit 10 performs, for example, processing to receive operation on the operation unit 13, processing to perform game determination or the like according to the received operation, processing to generate a game screen to be displayed on the display unit 11 according to the received operation or to an event inside the game, or the like.

The display unit 11 displays an image supplied from the processing unit 10. The cartridge attachment section 12 is configured such that the cartridge 9 is detachably mounted to the cartridge attachment section 12. The processing unit 10 can read the game program 91, the character data 92, or the like, from the cartridge 9 attached to the cartridge attachment section 12. The operation unit 13 notifies the processing unit 10 of operation performed by a user (for example, pressing or releasing of a button).

The communication unit 14 transmits or receives data to/from a server device, another game device 1, or the like, via a communication network such as a mobile phone network and a local area network (LAN). The game device 1, for example, can use the communication unit 14 to communicate with the server device, download the game program 91, the character data 92, or the like, and store them in the second storage unit 16.

The first storage unit 15 is configured with a semiconductor memory element, or the like. The first storage unit 15 temporarily stores various kinds of data generated alongside the processing performed by the processing unit 10. The second storage unit 16 is configured with a non-volatile storage device having a larger capacity compared with the capacity of the first storage unit 15. The second storage unit 16 stores the game program 91, the character data 92, or the like.

The non-contact communication unit 21 performs non-contact data transmission and reception wirelessly with the dedicated FIG. 5 according to a communication standard, for example, ISO/IEC 18092 (also referred to as NFC). In this case, the communication distance is in a range from several centimeters to several meters. The non-contact communication unit 21 transmits to an IC tag 50 embedded in the dedicated FIG. 5, a signal for indicating reading of the stored data, and receives desired data as a response to the transmitted signal.

The non-contact communication unit 21 has a function of an IC tag reader. The non-contact communication unit 21 transmits a write-indication signal as well as transmits write data, making it possible to cause the IC tag 50 to perform data writing. In short, the non-contact communication unit 21 also has a function of an IC tag writer. The non-contact communication unit 21 is not limited to NFC. That is, it is possible to use, for example, a various kinds of communication systems, such as RFID, employed as a non-contact communication or a short-distance wireless communication.

Figure 3:
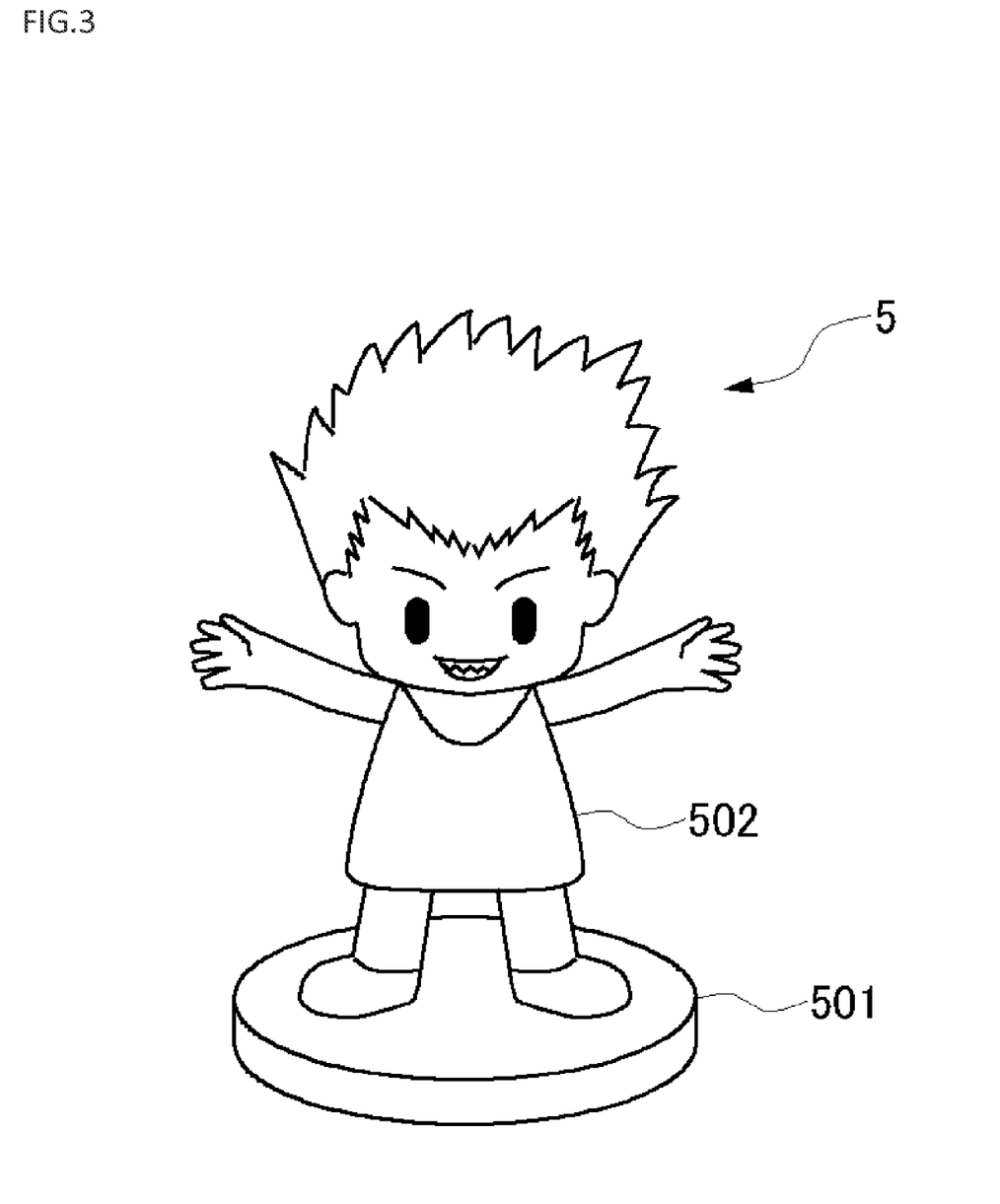
FIG. 3 shows an example non-limiting external view of a dedicated figure.
Figure 4:
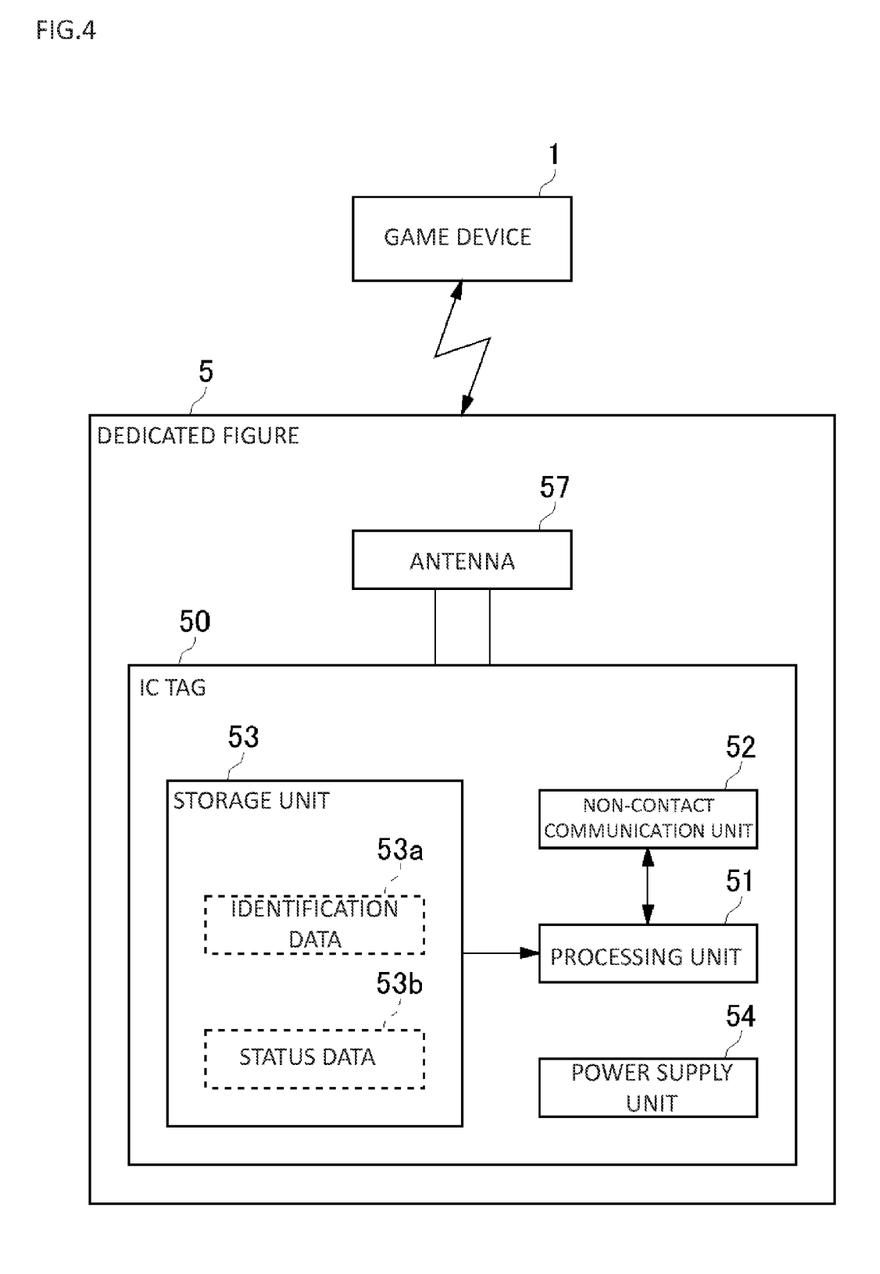
FIG. 4 shows an example non-limiting block diagram of the dedicated figure configuration.

FIG. 3 is an external view of the dedicated FIG. 5. FIG. 4 is a block diagram showing a configuration of the dedicated FIG. 5. As shown in FIG. 3, the dedicated FIG. 5 has abase 501, and a character design 502 formed with a material such as synthetic resin, provided on this base 501. The base 501 incorporates the IC tag 50 and an antenna 57 as a configuration for performing non-contact communication (non-contact communication function), as shown in FIG. 4.

The antenna 57 may be configured such that a wire is arranged in a spiral shape and each of ends of the wire is connected to the IC tag 50. The IC tag 50 is provided as an IC chip incorporating a processing unit 51, a non-contact communication unit 52, a storage unit 53, and a power supply unit 54.

The IC tag 50 has no power source such as a battery. The IC tag 50 operates using an electromotive force generated by electromagnetic induction, or the like, occurring when receiving a radio signal via the antenna 57 from the game device 1. The IC tag 50 is a passive tag. The power supply unit 54, using the above-described electromotive force, supplies power to internal units of the IC tag 50 such as the processing unit 51, the non-contact communication unit 52, and the storage unit 53, so as to operate each of the units. In the present embodiment, the IC tag 50 is a passive tag. Alternatively, the IC tag 50 may be an active tag.

The non-contact communication unit 52 receives a signal transmitted from the game device 1 at the antenna 57, supplies data related to the received signal to the processing unit 51. At the same time, the non-contact communication unit 52 transmits the data supplied from the processing unit 51 to the game device 1 from the antenna 57. The storage unit 53 is configured with a data-rewritable non-volatile memory element and stores an identification data 53a provided separately to each of the IC tags 50, and stores status data 53b of a character used in a game. The identification data 53a include information on the character type represented in the dedicated FIG. 5.

The processing unit 51, corresponding to the data supplied from the non-contact communication unit 52, reads data from the storage unit 53, and then, supplies the read data to the non-contact communication unit 52 so as to transmit the data to the game device 1. Furthermore, the processing unit 51, corresponding to the data supplied from the non-contact communication unit 52, writes data into the storage unit 53.

In this manner, the IC tag 50 provided as an IC chip includes the storage unit 53. Accordingly, the IC tag 50 including the storage unit 53 can also be a data storage medium having a non-contact communication function. In short, the base 501 of the dedicated FIG. 5 incorporates a data storage medium being configured to store data and having a non-contact communication function.

In the IC tag 50, various kinds of data related to the character corresponding to a design of the dedicated FIG. 5 are stored as the identification data 53a. In FIG. 1, one dedicated FIG. 5 is simply shown. Alternatively, a plurality of types of dedicated FIG. 5, each having a different character and storage data from each other, may be provided and be used with the game device 1. In a specific game according to the present embodiment, a character read from the IC tag 50 of the dedicated FIG. 5 appears as another character, that is a character different from an own character, in the game.

In the game device 1 according to the present embodiment, as shown in FIG. 1, the processing unit 10 executes the game program 91. This causes an operation reception processing unit 31, a game processing unit 32, a display processing unit 33, a tag data processing unit 34, or the like, to be implemented on the processing unit 10, as each of software function blocks.

The operation reception processing unit 31 periodically checks the state of the operation unit 13, thereby performing processing to receive user operation in a game. The game processing unit 32, corresponding to the operation the operation reception processing unit 31 has received, performs various kinds of determination processing, event processing, or the like, related to the game. The display processing unit 33 generates a game screen corresponding to a processing result of the game processing unit 32, supplies the generated game screen to the display unit 11 so as to display the game screen on the display unit 11. The tag data processing unit 34 uses non-contact communication provided by the non-contact communication unit 21 to perform processing such as reading and writing of data from/to the IC tag 50 of the dedicated FIG. 5.

The following is a description of an example game implemented by execution of the game program 91 according to the present embodiment by the processing unit 10 of the game device 1. In this example game, a user operates one's own character in a virtual space (map). The own character moves on in the virtual space while talking and battling with another character, as well as increasing the number of possessed items (accessories or equipment). The item can be obtained by winning a battle with the other character or by talking with the other character. The item can alternatively be purchased at a shop provided inside the virtual space. The own character proceeds to a subsequent virtual space by winning the battle with the other character.

When predetermined operation is performed during the game, the IC tag 50 of the dedicated FIG. 5 is read. Based on the read data, processing (referred to as "figure data processing") is performed in the game processing unit 32. This figure data processing corresponds to a "first information processing". There are two methods for starting the figure data processing.

Figure 5:
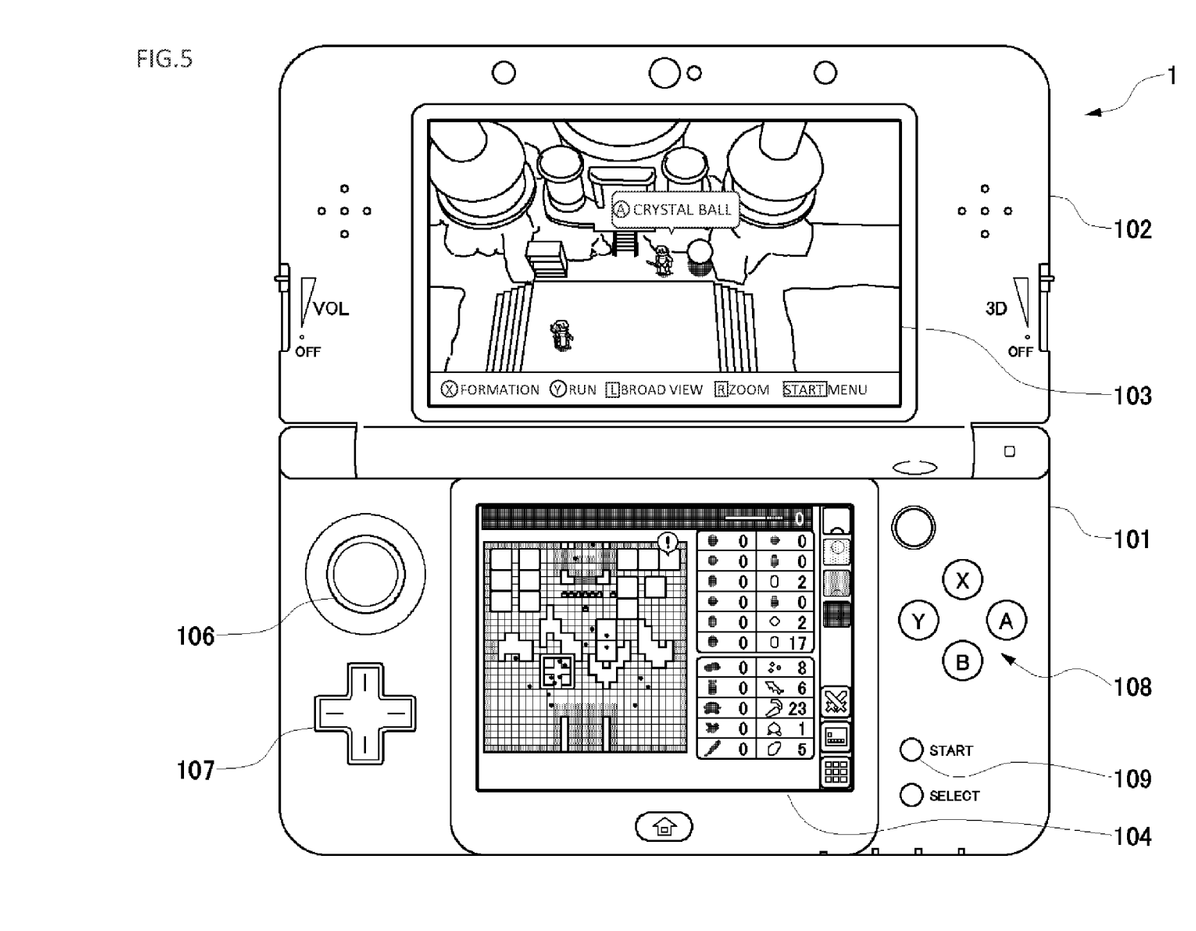
FIG. 5 shows an example non-limiting game screen.

One example is a method to start the processing by operating the own character in the virtual space, and then going to a predetermined place and performing a predetermined operation. FIG. 5 shows an example screen for this case. As shown in FIG. 5, the lower screen 104 shows a map of an entire virtual space and possessed items of the own character, and the upper screen 103 shows the own character and surrounding objects in the virtual space. As shown in an example of FIG. 5, an own character 41 has come to a position where a crystal ball exists, and there is an indication that pressing an A button enables access to the crystal ball. If the user presses the A button in this state, the lower screen 104 displays a message to prompt the user to touch the dedicated FIG. 5 to the lower screen 104.

Figure 6:
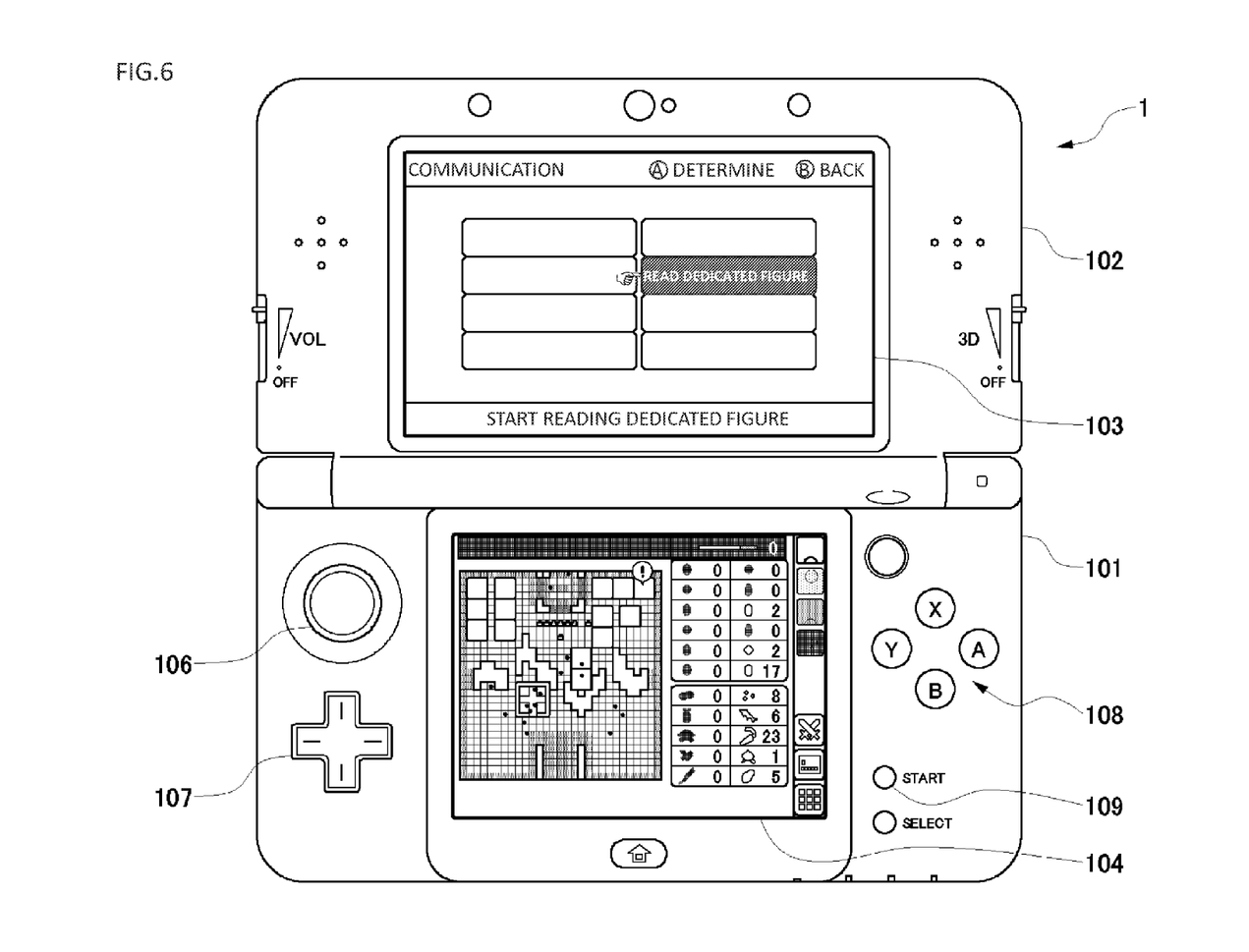
FIG. 6 shows an example non-limiting game screen.

Another example is a method to start the processing by moving from a menu screen to the figure data processing. As shown in FIG. 5, "START/MENU" is displayed on the upper screen 103 during game execution. In this state, pressing the start button 109 permits moving to the menu. When the user presses the start button 109 according to the display, the user can move to the menu screen. FIG. 6 is a diagram showing a menu screen example displayed in response to an indication toward the start button 109. The menu includes processing of reading the dedicated FIG. 5 at the non-contact communication unit 21. When the user selects this, the display unit 11 displays a message to prompt the user to touch the dedicated FIG. 5 to the lower screen 104.

By using any of the above-described methods, a message to prompt the user to touch the dedicated FIG. 5 to the lower screen 104. According to this message, when the user touches the possessed dedicated FIG. 5 to the lower screen 104, the IC tag 50 inside the dedicated FIG. 5 communicates with the non-contact communication unit 21 of the game device 1 by using the antenna 57. The tag data processing unit 34 reads the identification data 53a of the dedicated FIG. 5 via the non-contact communication unit 21. The game processing unit 32 displays (causes to appear) in a predetermined position of the virtual space, a character (hereinafter, referred to as a "figure-corresponding character") that corresponds to the read identification data 53a.

Data for electronically displaying this figure-corresponding character are included in the character data 92. The character data 92 of the figure-corresponding character may be stored in the storage unit 53 of the dedicated FIG. 5. In this case, the game device 1, when performing reading processing of the dedicated FIG. 5, can also read the character data 92 of the figure-corresponding character. The game device 1 can display the figure-corresponding character by using the read character data 92.

When the figure-corresponding character is displayed in the virtual space, the user can operate the own character and talk to the figure-corresponding character. When the operation reception processing unit 31 receives operation prompting the own character to talk to the figure-corresponding character, the game processing unit 32 performs predetermined processing after a conversation is started between the own character and the figure-corresponding character.

Herein, the first storage unit 15 stores a counter and a flag. The counter and the flag are associated with the identification data 53a stored in the storage unit 53 of the dedicated FIG. 5. The game processing unit 32 increments a count value of the counter each time the figure data processing is performed. The flag setting 0/1 indicates disable/enable of the figure data processing. The game processing unit 32 permits (enables execution of) the figure data processing when the flag stored in the first storage unit 15 is set to 1, and prohibits the figure data processing when the flag is set to 0. A default value of the flag is 1 (enable).

The game processing unit 32, when it has performed the figure data processing, increments the count value of the counter of the first storage unit 15, and at the same time, changes the flag to 0 (disable), so as to eliminate the figure-corresponding character from the virtual space for a moment. At this time, the flag has been set to 0, disabling restart of the figure data processing in this status.

If a predetermined condition is satisfied when the flag is set to 0 in a game, the flag is changed to 1 (enable) enabling the figure data processing. Specifically, when a user has operated its own character to move from a virtual space to another virtual space (battle map) to fight (battle) with another character, and then has operated to return to the original virtual space, that is when a user has performed processing referred to as "battle processing", the game processing unit 32 sets the flag to 1. In this manner, it is not possible to perform the figure data processing in succession. The subsequent figure data processing is possible when the flag is set from 0 to 1 by the battle processing after the figure data processing has been performed. This execution of the battle processing corresponds to a "first predetermined condition".

The game processing unit 32 performs processing according to the count value as predetermined processing in the figure data processing. That is, the predetermined processing performed in the figure data processing varies depending on the number of times of figure data processing.

In the present example, in first-time and second-time figure data processing, options are presented after a conversation, as predetermined processing. When the user selects and specifies any of the presented options and sends an indication. The operation reception processing unit 31 receives this selection. There is an item corresponding to the option received by the operation reception processing unit 31. The game processing unit 32 adds this item as a possessed item of the own character. The item obtained in this context can be obtained uniquely by using the figure data processing. This item may be the item related to the figure-corresponding character.

In third figure data processing, the figure-corresponding character suggests a battle toward the own character in a conversation. When the user responds to this suggestion and indicates a battle with the figure-corresponding character, the own character moves to another virtual space (battle map) and starts a battle with the figure-corresponding character based on user's operation. If the own character wins this battle, the own character enables the figure-corresponding character to be used as one's own character. Herein, enabling means being possible to use the figure-corresponding character thereafter without a need to read the dedicated FIG. 5. To win the battle with the figure-corresponding character corresponds to a "second predetermined condition". The enabling processing of the figure-corresponding character corresponds to "second information processing".

In fourth or subsequent figure data processing after the figure-corresponding character has been enabled, the figure-corresponding character tends a shop provided inside the virtual space. In the shop, the own character can purchase an item related to the figure-corresponding character.

In this manner, in the game system 100 according to the present embodiment, the non-contact communication unit 21 and the tag data processing unit 34 of the game device 1 read, during a game, the identification data 53a (including the character type information) stored in the IC tag 50 incorporated in the dedicated FIG. 5, and perform the figure data processing based on the read data. At this time, the game processing unit 32 updates the count value of the first storage unit 15. Thereafter, the game processing unit 32 performs figure data processing including content that corresponds to the count value. This configuration can improve enjoyment of the game that uses the dedicated FIG. 5.

The game system 100 according to the present embodiment does not permit consecutive execution of the figure data processing and imposes a predetermined condition for moving from previous figure data processing to subsequent figure data processing, namely, moving to another virtual space and performing a battle (executing battle processing). In the game device 1, for managing whether this predetermined condition is satisfied, a flag is provided in the first storage unit 15. When a battle is performed in another virtual space, the flag is rewritten so as to permit the figure data processing. With this configuration, it is possible to achieve a good balance between the figure data processing using the dedicated FIG. 5 and the usual game play using the game program 91.

In the above-described embodiment, figure data processing is prohibited (not permitted) when the flag is set to 0. Specifically, it is possible to configure such that the dedicated FIG. 5 may not be read when the flag is set to 0. In addition to this configuration, when the flag is set to 0, it is possible to configure such that the dedicated FIG. 5 can be read and the figure data processing cannot be completed. It may be configured, for example, such that when the flag is set to 0, the dedicated FIG. 5 can be read but conversation with the figure-corresponding character may not be performed, or an item may not be supplied even if stages up to the conversation are permitted.

Furthermore, in the above-described embodiment, every time the figure data processing is performed, the count value is incremented and the flag is changed from 1 to 0. Alternatively, it is possible to configure such that, at a timing of reading the dedicated FIG. 5 by the game device 1, the count value may be incremented and the flag may be changed from 1 to 0.

Furthermore, in the above-described embodiment, the condition (first predetermined condition) to change the flag from 0 to 1 is execution of the battle processing. The configuration, however, is not limited to this. The first predetermined condition may be, for example, such that a predetermined length of time has elapsed, or a certain amount of points have been added.

In the above-described embodiment, the character representation body 5 is provided in a form of figure. The character representation body 5 is not, however, limited to a figure and may be a stuffed toy having a design of the character. In this case, the stuffed toy can incorporate the non-contact communication function including the IC tag 50 and the antenna 57.

Furthermore, the character representation body 5 is not limited to a three-dimensional character representation such as a figure and a stuffed toy. It may by a trading card on which the character is printed. In this case, the trading card may incorporate the non-contact communication function. The character representation body 5 is not limited to anything that is used as a toy in itself. If the character representation body 5 is anything used as a toy in itself, however, it is possible to enjoy collecting various kinds of character representation bodies 5 as well as use it with the game device 1.

Furthermore, the information processing device 1 in the above-described embodiment is a portable game device with a foldable shape. The information processing device 1 is not limited to this, and may be a game system having separate main-body and a controller, using a general-purpose display. Furthermore, the information processing device 1 is not limited to game-only device. It may be a general-purpose computer including a smartphone and a tablet PC.

Furthermore, the configuration of the game device 1 in FIG. 1 may be distributed to a plurality of devices. The plurality of devices may communicate with each other wirelessly or via wired communication, and there may be a communication network for connecting each of the plurality of devices.

What is claimed is:

1. An information processing system comprising:
a data storage medium being configured to store data and having a non-contact communication function, and
at least one processor,
the at least one processor being configured to read the data from the data storage medium by using the non-contact communication function of the data storage medium,
the at least one processor being further configured to perform first information processing based on the data that have been read,
the at least one processor being further configured to store the number of times of execution of reading of the data or the number of times of the first information processing,
wherein processing details of the first information processing depend on the stored number of times of execution.

2. The information processing system according to claim 1, the at least one processor being further configured to prohibit consecutive execution of the first information processing.

3. The information processing system according to claim 2, the at least one processor being further configured to be capable of executing subsequent first information processing in a case where a first predetermined condition is satisfied after execution of the first information processing.

4. The information processing system according to claim 1, the at least one processor being further configured to execute second information processing based on the data, when the stored number of times of execution is the predetermined number of times, and a second predetermined condition is satisfied in the first information processing.

5. The information processing system according to claim 1, wherein the data storage medium is provided in a character representation body that represents a character, the data corresponds to the character represented by the character representation body, and the first information processing is information processing using the data.

6. An information processing device comprising:
at least one processor,
the at least one processor being configured to read data from a data storage medium by using a non-contact communication function of the data storage medium being configured to store data and having the non-contact communication function, the at least one processor being further configured to perform first information processing based on the data that have been read, the at least one processor being further configured to store the number of times of execution of reading of the data or the number of times of execution of the first information processing, wherein processing details of the first information processing depend on the stored number of times of execution.

7. An information processing method comprising:

reading data from a data storage medium by using a non-contact communication function of the data storage medium being configured to store data and having the non-contact communication function, performing first information processing based on the data that have been read, and storing the number of times of execution of reading of the data or the number of times of execution of the first information processing, wherein processing details of the first information processing depend on the stored number of times of execution.

8. A non-transitory computer-readable storage medium that stores an information processing program, the information processing program being configured to cause a computer to read data from a data storage medium by using a non-contact communication function of the data storage medium being configured to store data and having the non-contact communication function, perform first information processing based on the data that have been read, store the number of times of execution of reading of the data or the number of times of execution of the first information processing, wherein processing details of the first information processing depend on the stored number of times of execution.

* * * * *